(12) United States Patent
Beverly et al.

(10) Patent No.: US 7,376,146 B2
(45) Date of Patent: May 20, 2008

(54) BUS CONVERSION DEVICE, SYSTEM AND METHOD

(75) Inventors: Harlan T. Beverly, McDade, TX (US);
Percy W. Wong, Austin, TX (US);
Bradley J. Booth, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1057 days.

(21) Appl. No.: 10/150,366

(22) Filed: May 16, 2002

(65) Prior Publication Data

US 2003/0214974 A1 Nov. 20, 2003

(51) Int. Cl.
*H04J 3/16* (2006.01)

(52) U.S. Cl. .................. 370/465; 370/476; 370/542

(58) Field of Classification Search ............... None
See application file for complete search history.

(56) References Cited

U.S. PATENT DOCUMENTS

| | | | |
|---|---|---|---|
| 5,651,002 | A | 7/1997 | Van Seters et al. |
| 6,064,674 | A | 5/2000 | Doidge et al. |
| 6,081,523 | A * | 6/2000 | Merchant et al. ........... 370/389 |
| 6,556,589 | B2 * | 4/2003 | McRobert et al. .......... 370/501 |
| 6,873,630 | B1 * | 3/2005 | Muller et al. ................ 370/356 |
| 7,031,324 | B1 * | 4/2006 | Goody ........................ 370/401 |
| 2001/0014104 | A1 | 8/2001 | Bottorff et al. |
| 2004/0081145 | A1 * | 4/2004 | Harrekilde-Petersen et al. ........................... 370/362 |

FOREIGN PATENT DOCUMENTS

EP 0 300 350 1/1989

OTHER PUBLICATIONS

*European Office Action*, Dated Apr. 14, 2005; 03752991.4; 6 Pgs.
PCT International Search Report dated Mar. 2, 2004 (related International Application No. PCT/US 03/12793—International Filing Date Apr. 24, 2003) (6 pgs.).
Supplement to Carrier Sense Multiple Access with Collision Deteciton (CSMA/CD) Access Method and Physical Layer Specifications—Media Access Control (MAC) Parameters, Physical Layer, and Management Parameters for 10 Gb/s Operation, IEEE P802.3ae/D4.3, Apr. 15, 2002, clauses 46-52.
Carrier Sense Multiple Access with Collision Deteciton (CSMA/CD) Access Method and Physical Layer Specifications, IEEE standard 802.3-2000, clause 35.
Broadcom BCM5632 brief.
Written Opinion in related PCT Application, dated Nov. 21, 2006 (6 pgs).
"Bus Conversion Device, System and Method", Office Action Received for TW Application No. 092113225, (Sep. 3, 2004).

(Continued)

*Primary Examiner*—Wing Chan
*Assistant Examiner*—Michael J. Moore
(74) *Attorney, Agent, or Firm*—Grossman, Tucker, Perreault & Pfleger, PLLC (57) ABSTRACT

Disclosed are a system and method of transmitting data frames between media independent interfaces (MIIs) in a bus conversion device. Data frames received at a first MII may be formatted according to a first data transmission protocol. A bus conversion device formats the data frame for forwarding to a second MII. The bus conversion device may transmit data frames between MIIs having different associated data rates and data frame formats.

19 Claims, 6 Drawing Sheets

OTHER PUBLICATIONS

Chinese Office Action Dated Nov. 10, 2006 for application No. 03810900.X, 14 pgs.

Chinese Office Action dated Jul. 20, 2007 for application No. 03810900.X, 18 pgs.

* cited by examiner

BUS CONVERSION DEVICE, SYSTEM AND METHOD

BACKGROUND

1. Field

The subject matter disclosed herein relates to transmitting data according to a data transmission format. In particular, the subject matter disclosed herein relates to transmitting data between different data transmission formats.

2. Information

Data transmission protocols typically define how data is to be transmitted in a data link. For example, a data transmission protocol may define a format for data frame to be transmitted as well as data rates for transmitting data frames in data links. As data link communication protocols evolve, data communication from a source to a destination may include transmitting data frames on data links which transmit data according to different data transmission protocols. A communication path transmitting data between the source and destination typically comprises multiple data links where different data links in the communication transmitting data frames according to different data transmission protocols.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-executable instructions stored in a memory in combination with processing circuitry to execute such machine-readable instructions. However, these are merely examples of structures which may provide logic and embodiments of the present invention are not limited in this respect.

A "media independent interface" (MII) as referred to herein relates to an interface to receive data from source or transmit data to a destination in a format which is independent of a particular transmission medium for transmitting the data. For example, a data transceiver may transmit data to a transmission medium in a data transmission format in response to data received at an MII. Also, a data transceiver may provide data to an MII in response to receiving data from a transmission medium in a data transmission format. A "Gigabit MII" (GMII) as referred to herein relates to an MII capable of receiving data from a source or transmitting data to a destination at a data rate of about one gigabit per second. A "10 Gigabit MII" (XGMII) as referred to herein relates to an MII capable of receiving data from a source or transmitting data to a destination at a data rate of about ten gigabits per second. However, these are merely examples of an MII and embodiments of the present invention are not limited in these respects.

An "Extended Attachment Unit Interface" as referred to herein relates to a data link capable of transmitting data between an MII and data transceiver. A 10 Gigabit Extended Attachment Unit Interface" (XAUI) as referred to herein relates to a data link capable of transmitting data between an XGMII and a data transceiver. Other Extended Attachment Unit Interfaces may be defined for higher data rates such as 40 or 100 gigabits per second.

A "data byte" as referred to herein relates to a fixed quantity of data such as eight bits. A "data word" as referred to herein relates to a quantity of data comprising an integer number of related data bytes. However, these are merely examples of a data byte and data word, and embodiments of the present invention are not limited in these respects.

A "data frame" as referred to herein relates to a quantity of data that may be transmitted from a source to a destination according to a data transmission protocol. For example, a data frame may comprise data to be transmitted from a source to a destination in a data link according to a data link layer protocol. A data frame may be associated with a size that is based upon a quantity of data such as, for example, a number of data bytes in the data frame. However, this is merely an example of a data frame and embodiments of the present invention are not limited in this respect.

A data frame may be transmitted as a sequence of data bytes that are to be processed in the sequence at a destination. In one or more leading bytes of such a sequence of bytes, a data frame may comprise a "start code" as a symbol indicating the beginning of a data frame. Also, one or more of the trailing data bytes in such a sequence of data bytes may comprise "terminate code" as a symbol indicating the end of a data packet. However, these are merely examples of a start code and terminate code, and embodiments of the present invention are not limited in these respects.

A data frame may also be formatted for transmission from a source to a destination according an Ethernet protocol as provided in versions of the IEEE standard 802.3. Such an Ethernet data frame comprises fields including address fields to provide an "Ethernet address" for each of a destination and a source. This Ethernet address may also be known as a physical address, hardware address, or MAC address. Upon receipt of an Ethernet frame, a device may compare the destination address of the frame with a physical address associated with the device. If the destination address matches that of the receiving device, the device may read and deliver the entire data frame.

A "media access control" (MAC) device as referred to herein relates to a device enabling access a transmission medium to transmit or receive data. A MAC device may be coupled to an MII to enable a client process to transmit or receive data frames through a transmission medium. Also, a MAC device may be associated with an Ethernet address to receive and forward data frames having the associated Ethernet address. However, these are merely examples of a MAC device and embodiment of the present invention are not limited in these respects.

An "optical transmission medium" as referred to herein relates to a transmission medium that is capable of transmitting light energy in an optical signal which is modulated by a data signal that is recoverable by demodulating the optical signal. For example, an optical transmission medium may comprise fiber optic cabling coupled between a transmitting point and a receiving point. However, this is merely an example of an optical transmission medium and embodiments of the present invention are not limited in this respect.

A "backplane" as referred to herein relates to a system level circuit board that is capable of being coupled to one or more subsystem level circuit boards. For example, a backplane may comprise one or more sockets as "backplane interfaces" for integrating subsystem circuit boards or expansion cards. A backplane interface may also couple a backplane to an external transmission medium. However, these are merely examples of a backplane and backplane interface, and embodiments of the present invention are not limited in these respects.

Briefly, an embodiment of the present invention is directed to a method and apparatus to transmit data frames between a first MII and a second MII. The first MII may determine the size of the received data frame to enable the second MII to provide the received data frame to a destination. However, this is merely an example embodiment and other embodiments of the present invention are not limited in this respect.

Figure 1:
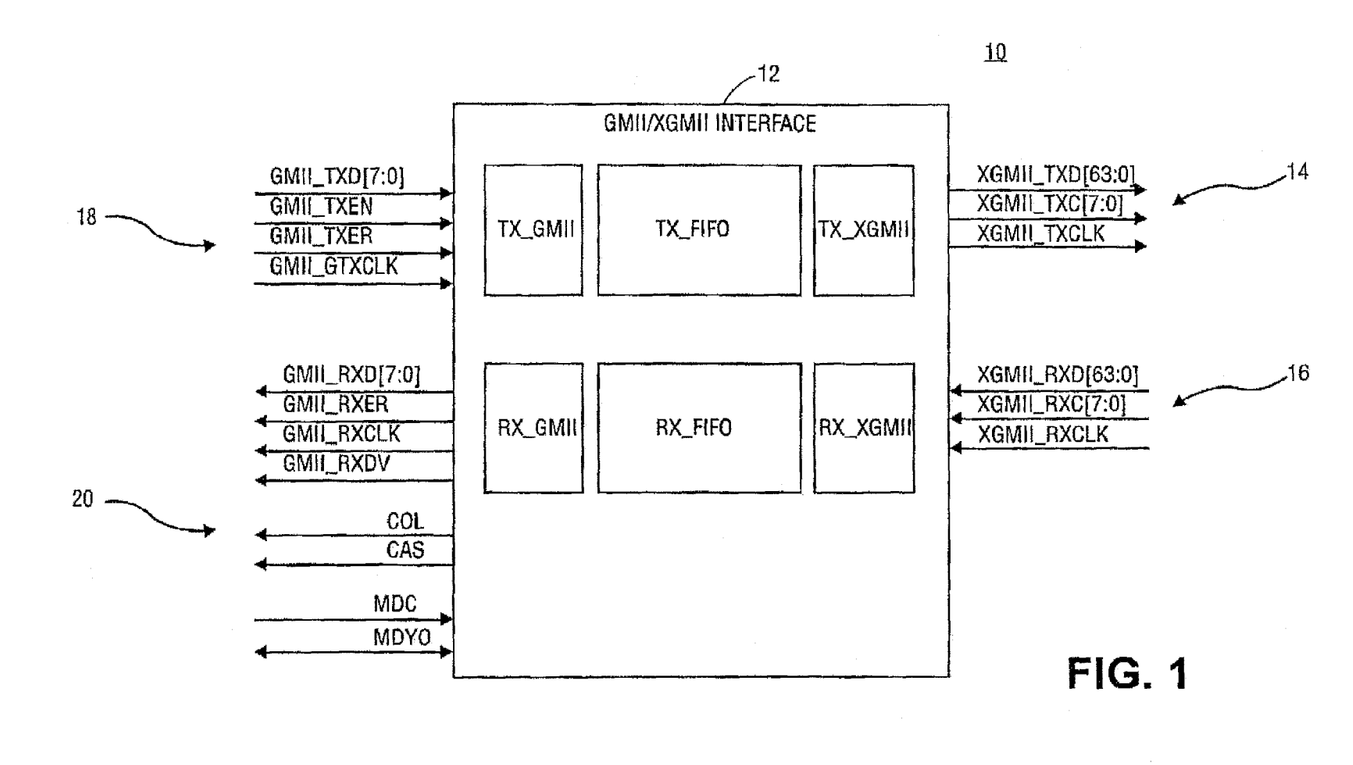
FIG. 1 shows an interface between two media independent interfaces (MIIs) according to an embodiment of the present invention.

FIG. 1 shows an interface 12 between two MIIs. A Gigabit MII (GMII) comprises a transmit interface 18 and a receive interface 20 while a 10 Gigabit MII (XGMII) comprises a transmit interface 14 and a receive interface 16. The transmit and receive interfaces 18 and 20 may be formed according to IEEE standard 802.3z or 802.3-2000, clause 35 while the transmit and receive interface 14 and 16 may be formed according to IEEE P802.3ae, clause 46. The interface 12 may comprise an application specific integrated circuit (ASIC) or a field programmable gate array (FPGA) circuit. However, these are merely examples of how a bus conversion device may be implemented in logic and embodiments of the present invention are not limited in these respects.

In one embodiment, the interfaces 18 and 20 may be coupled to a MAC device (not shown) adapted to transmit data to or receive data from the interface 12 according to IEEE standard 802.3-2000. Alternatively, the interfaces may be coupled to a device comprising a physical coding sublayer (PCS) (not shown) for transmitting data to or receiving data from a category 5 cable according to IEEE standard 802.3-2000, clause 40. However, these are merely examples of devices that may coupled to communicate with a GMII and embodiments of the present invention are not limited in this respect.

The transmit and receive interfaces 14 and 16 may be coupled to any one of several devices to transmit data to a destination or receive data from a source. In one embodiment, the interfaces 14 and 16 may be coupled to a physical layer device comprising physical medium attachment (PMA) and physical medium dependent (PMD) and physical coding sublayer (PCS) sections to communicate with an optical transmission medium according to IEEE P802.3ae, clauses 48 through 51. In another embodiment, the interfaces 14 and 16 may be coupled to a MAC (not shown) to transmit data between the XGMII and an I/O system such as a switch fabric or multiplexed data bus. Alternatively, the interfaces may be coupled to an XGMII extended sublayer (XGXS) circuit (not shown) to provide a 10 Gigabit Attachment Unit Interface (XAUI) according to IEEE P802.3ae, clause 47. However, these are merely examples of how an XGMII may communicate with devices and embodiments of the present invention are not limited in these respects.

Figure 2:
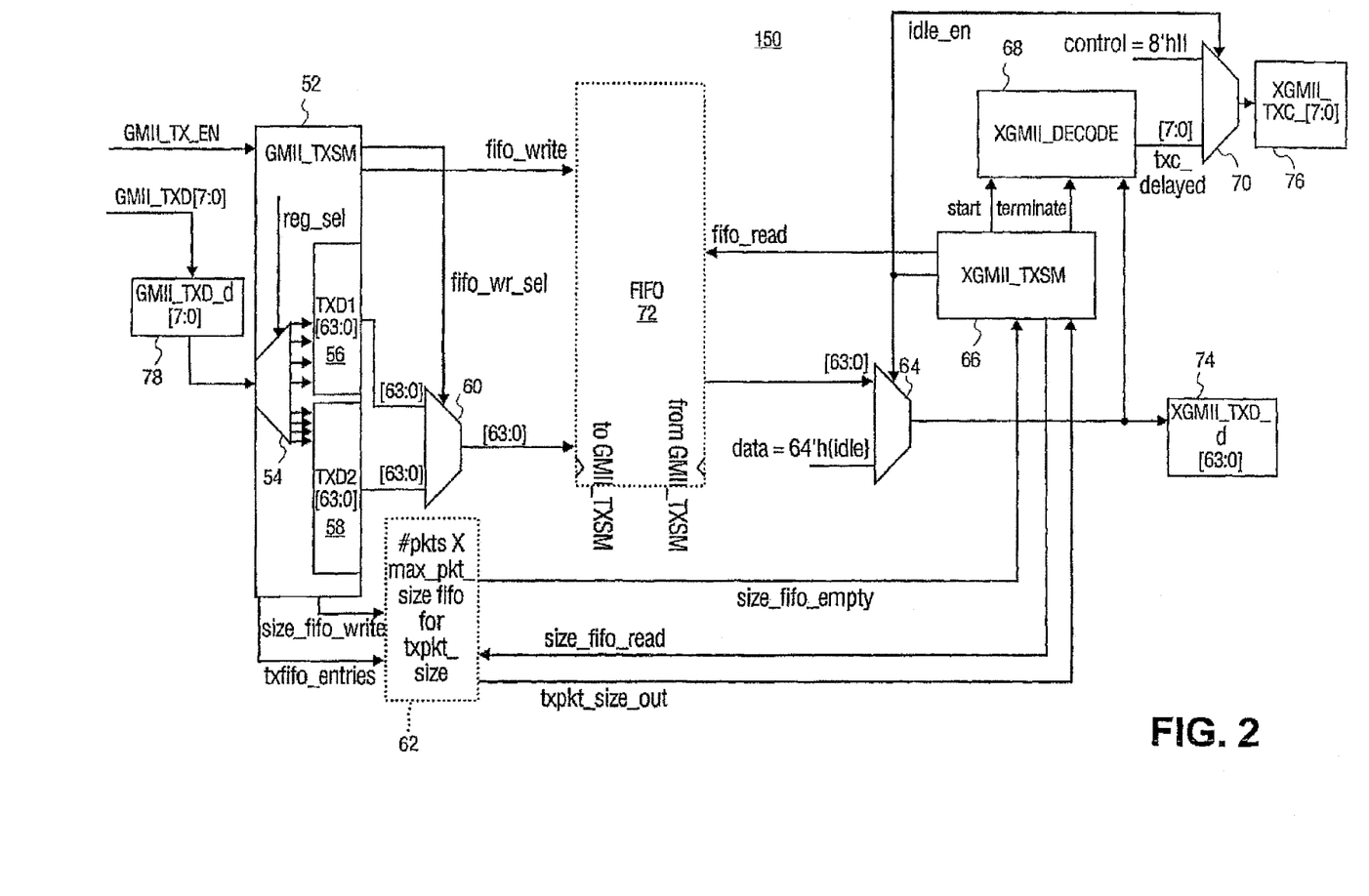
FIG. 2 shows an interface to forward data frames received at a Gigabit MII (GMII) to a 10 Gigabit MII (XGMII) according to an embodiment of the interface shown in FIG. 1.

FIG. 2 shows an interface 150 to forward data frames received at a GMII to an XGMII according to an embodiment of the interface 12 shown in FIG. 1. A GMII transmit state machine 52 receives sequentially clocked byte wide data 78 of a received data frame in response to an enable signal GMII_TXEN. Registers 56 and 58 each comprise sixty-four bits to receive eight of the received data bytes. A multiplexer 54 alternates loading registers 56 and 58 with the received data bytes to enable the data from one register to be written to a first-in-first-out (FIFO) buffer 72 while received data bytes are being loaded to the other register.

The GMII transmit state machine 52 may also determine the size of the received data frame by counting the number of bytes received as byte wide data 78. The GMII transmit state machine 52 may determine the start of a data frame by, for example, detecting a transition in the signal GMII_TX_EN from "0" to "1." All data bytes received as byte wide data 78 may then be counted until detecting a transition in the signal GMII_TX_EN from "1" to "0" indicating the end of the frame. The resulting byte count may then be stored in a buffer 62 associated with the data frame stored in the buffer 72. Alternatively, the GMII transmit state machine 52 may store the byte count in the buffer 72 in association with the stored data frame. However, these are merely examples how the size of a received data frame may be determined and recorded, and embodiments of the present invention are not limited in these respects.

The buffer 72 provides the stored data frames as multibyte words having eight bytes each in response to requests from an XGMII transmit state machine 66. The XGMII transmit state machine 66 also controls multiplexers 64 and 70 in response to the detection of a start of a data frame (read out from the buffer 72) and an end of the data frame. The XGMII transmit state machine 66 may detect the start of a data frame by, for example, detecting size information (e.g., byte count) being written to the buffer 62 or detecting changes in size information (e.g., byte count) the buffer 72. At the start the data frame, the XGMII transmit state machine 66 may de-assert signal idle_en to cause the multiplexer 64 to begin transmitting the multi-byte words 74 read out from the buffer 72 and the multiplexer 70 to transmit a control code 8'b00000001 on bytes XGMII_TXC_[7:0]. An XGMII decoder 68 provides a control code on signal txc_delayed[7:0] through the multiplexer 70 in response to a leading or trailing multi-byte word XGMII_TXD_d[63:0] being transmitted from the multiplexer 64. In one embodiment, a start code of "FB" may be inserted as the leading byte of the data frame which is stored in the buffer 72 such that the start code is the leading byte of the frame outputted on XGMII_TXD_d[63:0].

According to an embodiment, the GMII transmit state machine 52 may insert a start or terminate code into registers 56 or 58 to indicate the beginning or ending of a data frame. When the GMII transmit state machine 52 determines that the remaining bytes of a data frame to be loaded in the buffer 72 are fewer than a complete multi-byte word (e.g., fewer than eight bytes in the presently illustrated embodiment), a terminate code "FD" is inserted into the last multi-byte word read out to XGMII_TXD_d[63:0] followed by an idle code "07" in each remaining byte of the multi-byte word. Table 1 below shows the format of the last multi-byte word including a terminate code based upon the number of remaining data frame bytes in the last multi-byte word.

The XGMII transmit state machine 66 may determine the end of a data frame (read out as 64 bit words) by decrementing a byte count when each multi-byte word is read out from the buffer 72 (e.g., by eight in the presently illustrated embodiment of sixty-four bit words). The XGMII transmit state machine 66 may also determine control codes to be inserted into XGMII_TXC_[7:0] in response to detection a start and end of a data frame. When there are no data frames in the buffer 72 to transmit through the XGMII, the multiplexer 70 may output an idle control code of 8'b11111111 and the multiplexer 64 may output value 64'h0707070707070707 in response to an asserted idle_en signal. As discussed above, upon detection of the start of a data frame at the XGMII transmit state machine 66 and de-assertion of the idle_en signal, the multiplexer 70 may output the control code 8'b00000001. Between the start and terminate conditions, the multiplexer 70 may output 8'00000000 to indicate that data is present. When the XGMII transmit state machine 66 determines that the remaining bytes in the data frame in the buffer 72 are fewer than a complete multi-byte word (e.g., fewer than eight bytes in the presently illustrated embodiment), the multiplexer 70 outputs control code XGMII_TXC_[7:0] based upon the remaining bytes as shown in Table 1.

In the presently illustrated embodiment, the multiplexer 64 provides the output 74 as sequentially clocked sixty-four bit words and the multiplexer 70 provides the output 76 as sequentially clocked eight bit bytes. In this embodiment, latching circuitry (not shown) may be used partition the sixty-four bit output 74 into thirty-two bit words, and partition the eight bit output 76 into four bit quantities to provide a XGMII compliant output. Alternatively, GMII transmit state machine 52 and buffer 72 may store portions of received data frames as thirty-two bit words. The multiplexer 64 may then readout the output 74 as thirty bit words at about twice speed of reading out the sixty-four bit words in the aforementioned embodiment. Similarly, the multiplexer 70 and XGMII transmit state machine 66 may provide four bit control codes in the output 76 synchronized with the thirty-two bit output.

Figure 3:
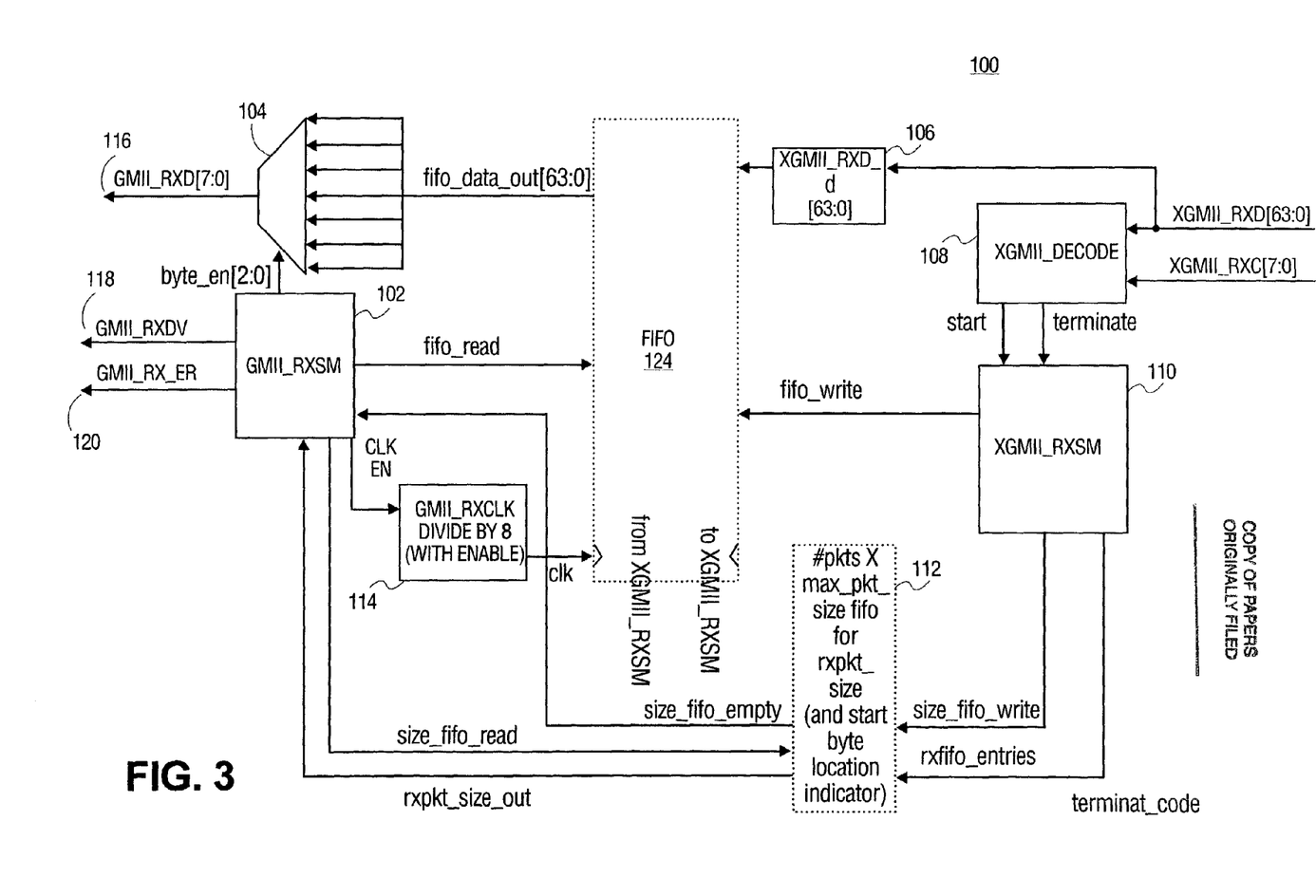
FIG. 3 shows an interface to forward data frames received at an XGMII to a GMII according to an embodiment of the interface shown in FIG. 1.

FIG. 3 shows an interface to forward data frames received at an XGMII to a GMII according to an embodiment of the interface 12 shown in FIG. 1. A data frame is received at an XGMII as sequentially clocked sixty-four bit input words 106 which are stored in a FIFO buffer 124. A multiplexer 104 may then read out the stored data frame as sequentially clocked eight bit output 116 as GMII_RXD[7:0] to a GMII. An XGMII decode section 108 also receives the input words 106 to detect a start code (e.g., "FB") in a first byte of the received data frame and a terminate code (e.g., "FD") in a last byte of the received data frame. The XGMII decode section 108 may provide start and terminate signals to an XGMII receive state machine 110 in response to detecting the start and termination codes. The start and terminate signals may enable the XGMII receive state machine 110 to determine the size (e.g., number of eight bit bytes) of the received data frame by counting the number of eight bit bytes in the received data frame. The XGMII receive state machine 110 may do this by, for example, determining a difference in time between receipt of the start signal and the terminate signal. However, this merely an example of how the size of a data frame received at an XGMII may be determined and embodiments of the present invention are not limited in this respect.

Upon determining the size of the received data frame, the XGMII receive state machine 110 may write size information as the number of received bytes in a buffer 112 in association with the received data frame stored in the buffer 124. Alternatively, XGMII receive state machine 110 may store the size of the received data frame with the received data bytes in the buffer 124. However, these are merely examples of how the size of a data frame may be stored in association with data frame bytes and embodiments of the present invention are not limited in these respects.

According to an embodiment, a multiplexer 104 outputs byte portions of the data frame stored in the buffer 124 in response to a byte_en[2:0] signal from a GMII receive state machine 102. The multiplexer 104 may receive the stored data frame in multi-byte wide quantities (e.g., sixty four bit words) and output the data frame as sequentially clocked eight bit bytes GMII_RXD[7:0]. In the illustrated embodi-

TABLE 1

| trailing vytes of data frame in last 8-byte word | XGMII_TXD[63:0] | XGMII_TXC[7:0] |
|---|---|---|
| 7 | 07070707070707FD | 8'b11111111 |
| 6 | 070707070707FDxx | 8'b11111110 |
| 5 | 0707070707FDxxxx | 8'b11111100 |
| 4 | 07070707FDxxxxxx | 8'b11111000 |
| 3 | 070707FDxxxxxxxx | 8'b11110000 |
| 2 | 0707FDxxxxxxxxxx | 8'b11100000 |
| 1 | 07FDxxxxxxxxxxxx | 8'b11000000 |
| 0 | FDxxxxxxxxxxxxxx | 8'b10000000 | ment, the input data to the multiplexer 104 may be refilled every eight clock cycles of the GMII as data is presented to the multiplexer 104 directly from the buffer 124. Concurrently with the output of the stored data frame as eight bit bytes GMII_RXD[7:0], the GMII receive state machine 102 may assert the signal GMII_RXDV to indicate detection of an error in data received at the XGMII (e.g., in response to an error control code received at XGMII_RXC[7:0]). Such an error condition may be detected by the XGMII receive state machine 110 and indicate such an error condition by setting a bit in the buffer 112 or buffer 124 in association with the received data frame stored in the buffer 124. In response to the indication of the error condition, the GMII receive state machine 102 may inhibit forwarding of the stored data frame through the multiplexer 104 by skip over the bytes of the stored data frame in the buffer 124.

According to an embodiment, the XGMII receive state machine 110 may detect error conditions on a received data frame by sensing an XGMII_RXC[7:0] bit set during a frame transmission (framed by START and TERMINATE) while the corresponding byte in XGMII_RXD[63:0] is not the START, TERMINATE or IDLE code. In this condition, the XGMII receive state machine 110 may be signaled by the XGMII decode section 108 set the aforementioned error bit in either buffer 112 or buffer 124. An interpacket error may also be detected by the XGMII decode section 108 by a XGMII_RXC[7:0] bit set during idle time (framed by TERMINATE and START codes), while the corresponding XGMII_RXD[63:0] byte is not the START, TERMINATE, or IDLE code. This condition may be ignored. In addition, if XGMII_RXC[7:0] indicates data (by being 0 in any bit), then that data may be ignored since this would precede detection of the START code.

According to an embodiment, the three bit signal byte_en[2:0] selects a particular byte (out of a possible eight bytes in the presently illustrated embodiment) to be output by the multiplexer 104. Also, the GMII receive state machine 102 may determine the last byte of the stored data frame to be transmitted based upon the size information stored by the XGMII receive state machine 110 as discussed above. For example, the GMII receive state machine 102 may decrement a byte count which is stored in either the buffer 112 or 124 associated with the stored data frame. Upon determining the last byte in the data frame, the GMII receive state machine 102 may provide a value for the signal byte_en[2:0] to skip over the terminate code in the stored data frame (e.g., "FD") and de-assert the signal GMII_RXER following transmission of the last byte prior to the terminate code.

Figure 4:
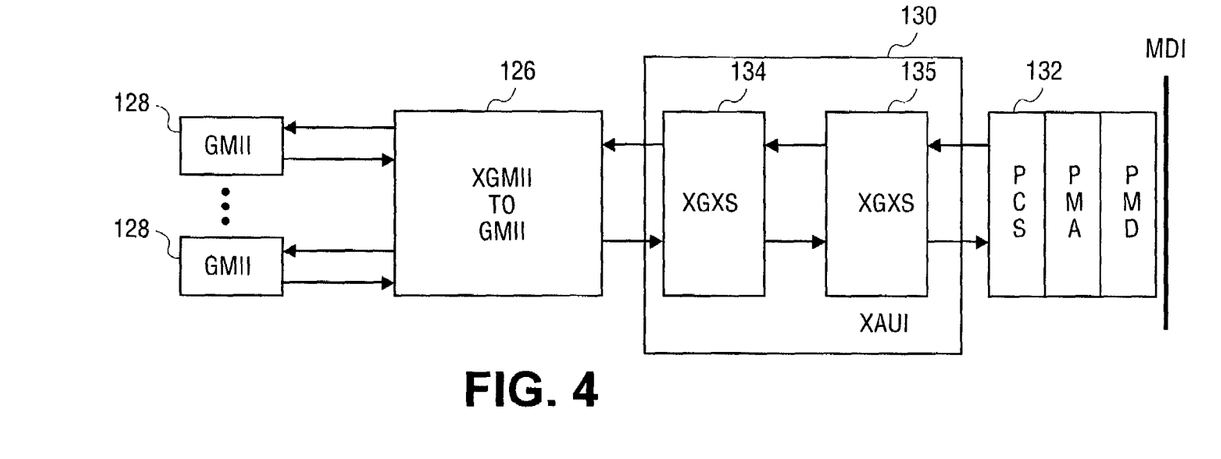
FIG. 4 shows an embodiment of the present invention comprising an XGMII coupled to communicate with a plurality of GMIIs incorporating a GMII to XGMII interface as shown in FIG. 1.
Figure 5:
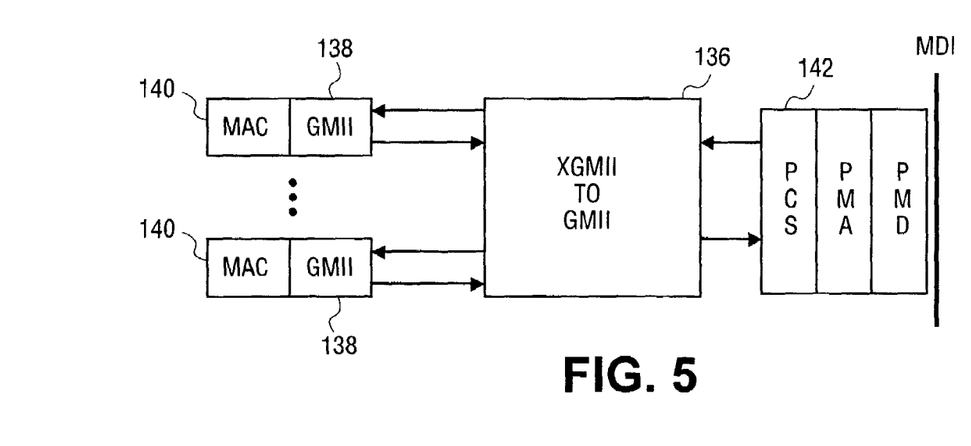
FIG. 5 shows an alternative embodiment of the present invention comprising an XGMII coupled to communicate with a plurality of GMIIs incorporating a GMII to XGMII interface as shown in FIG. 1.

FIGS. 4 and 5 show systems incorporating a GMII to XGMII interface according to the interface 12 shown in FIG. 1. In FIG. 4, an XGMII to GMII interface 126 is coupled to transmit data between a 10 Gigabit Attachment Unit Interface (XAUI) data link 130 (coupled to the interface 126 at an XGMII) and a plurality of GMIIs 128. In the illustrated embodiment, the XAUI data link 130 may extend across a printed circuit board or backplane to provide a serial link between an external attachment and GMII compatible devices coupled to the GMIIs 128.

The XAUI data link 130 comprises a first XGMII Extended Sublayer (XGXS) device 134 coupled to an XGMII on the interface 126 and a second XGXS device 135 coupled to a data transceiver 132 as provided in the IEEE standard 802.3ae, clause 47. It should be understood, however, that other extended sublayer devices may be used to support physical transmissions protocols for increased data rates including, for example, 40 or 100 gigabit Ethernet formats. The first and second XGXS devices 134 and 135 may be coupled on a printed circuit board by traces extending up to approximately 50 cm. The data transceiver 132 may comprise a physical coding sublayer (PCS) portion, physical media attachment (PMA) portion and a physical media dependent (PMD) portion to transmit or receive data from an optical transmission medium through a media dependent interface (MDI) as provided in the IEEE standard 803.3ae, clauses 49 through 52.

In this embodiment, a GMII 128 may be coupled to any on of several devices capable of communicating through a GMII including, for example, a MAC device or data transceiver comprising PCS and PMA portions to communicate over an transmission medium. However, these are merely examples of devices that may be coupled to a GMII and embodiments of the present invention are not limited in these respects.

In FIG. 5, an XGMII to GMII interface 136 is coupled to transmit data between a data transceiver 142 and a plurality of MAC devices 140 (coupled to GMIIs 138) enabling a plurality of independent devices to transmit and receive data through a common XGMII. In one application, the MAC devices 140 enable multiple network clients in a local area network (LAN) to use the common XGMII. However, these are merely examples of how multiple MACs may be employed for communicating in a common XGMII and embodiments of the present invention are not limited in these respects.

Figure 6:
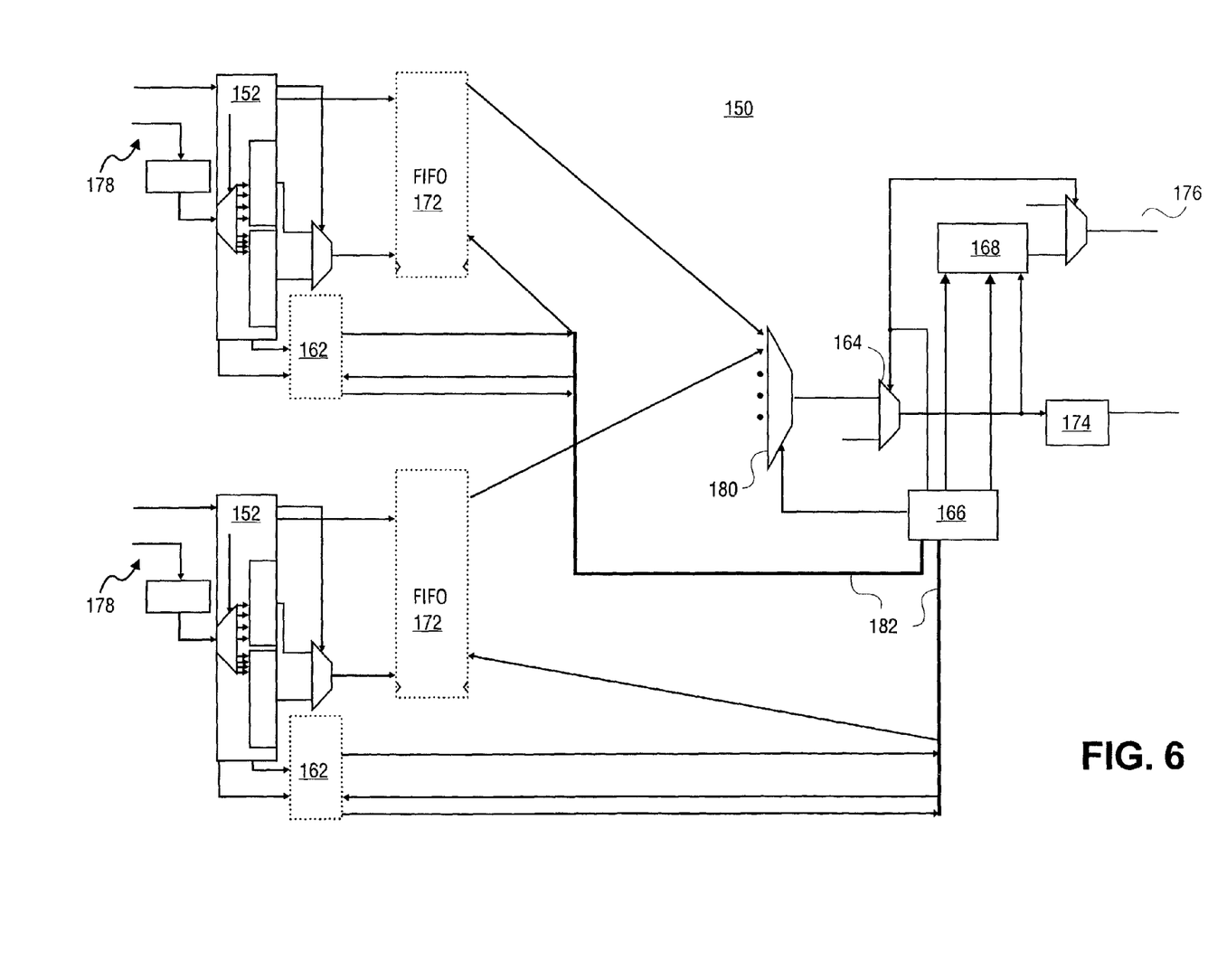
FIG. 6 shows an interface to forward data frames from a plurality of GMIIs to a single XGMII according to either of the alternative embodiments shown in FIGS. 4 and 5.
Figure 7:
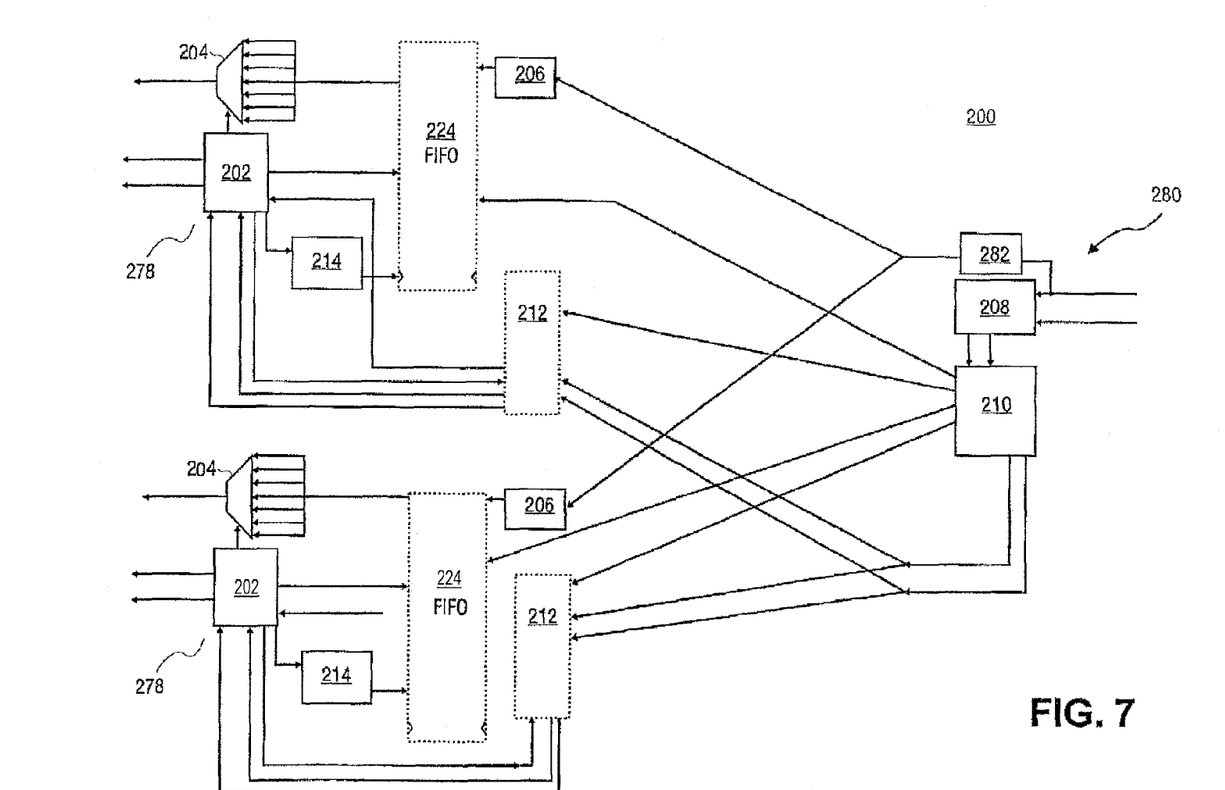
FIG. 7 shows an interface to forward data frames from a single XGMII to a plurality of GMIIs according to either of the alternative embodiments shown in FIGS. 4 and 5.

FIGS. 6 and 7 show an interface to forward data frames between an XGMII and a plurality of GMIIs according to either alternative embodiments of the present invention shown in FIGS. 4 and 5. FIG. 6 shows an interface to forward data frames from a plurality of GMIIs 178 to a single XGMII according to an embodiment of the interface 126 or 136 shown in FIGS. 4 and 5. Each of the GMIIs 178 comprise a buffer 172 to store data frames received as sequentially clocked eight bit bytes at a GMII transmit state machine 152 as discussed above with reference to FIG. 2. The GMII transmit state machine 152 may also determine the size of the received data frame by counting the received data bytes while the signal GMII_TX_EN is asserted also as discussed with reference to FIG. 2.

The XGMII may read out data frames from the buffers 172 through a multiplexer 180 as sequentially clocked sixty four bit words. While each of the GMIIs 178 may independently receive data frames to be stored in an associated buffer 172, an XGMII transmit state machine 166 may control the selection of GMII interfaces 178 to provide the stored data frames. In the illustrated embodiment, the XGMII transmit state machine 166 selects to receive an entire data frame from a GMII 178 before selecting to receive any portion of a data frame from a subsequent GMII 178. The XGMII transmit state machine 166 may select a GMII 178 to commence forwarding a data frame (from an associated buffer 172) from among only those GMIIs 178 having a complete date frame stored in the associated buffer 172. Accordingly, upon completion of reading out a data frame from a GMII 178, the XGMII transmit state machine 166 may select a subsequent GMII 178 (having a complete data frame stored in its associated buffer 172) to commence providing a data frame to the multiplexer 180 by asserting the signal fifo_read on a bus 182.

As discussed above with reference to FIG. 2, the GMIIs 178 may maintain a byte count in a buffer 162 which is accessible by the XGMII transmit state machine 166 when reading out data frames. The XGMII transmit state machine 166 may determine the end of a data frame (read out as 64 bit words) by decrementing the byte count as each multibyte word is read out from a buffer 172. When the XGMII transmit state machine 166 determines that the remaining bytes in the data frame in the buffer 72 are fewer than a complete multi-byte word, a terminate code "FD" is inserted into the last multi-byte word read out to XGMII_TXD_d [63:0] followed by an idle code "07" in each remaining byte of the multi-byte word. Table 1 above shows a format for the trailing bytes to be inserted in the sixty four bit word based upon the number of remaining data frame bytes in the last multi-byte word.

The XGMII transmit state machine 166 may also determine error codes to be inserted into XGMII_TXC_[7:0] (as discussed above with reference to FIG. 2) in response to detection a start and end of a data frame. When the XGMII transmit state machine 166 determines that the remaining bytes in the data frame in the buffer 72 are fewer than a complete multi-byte word (e.g., fewer than eight bytes in the presently illustrated embodiment), the multiplexer 70 outputs an error code XGMII_TXC_[7:0] based upon the remaining bytes as shown in Table 1.

FIG. 7 shows an interface to forward data frames from a single XGMII to a plurality of GMIIs 278 according to an embodiment of the interface 126 or 136 shown in FIGS. 4 and 5. In the presently illustrated embodiment, an XGMII 280 comprises an XGMII receive state machine 210 to forward received data frames to selected GMIIs 278. The XGMII receive state machine 210 may forward received data frames to the GMIIs 278 using any one of several routing schemes such as, for example, a round robin scheme, TCP/IP routing scheme to route specific IP data gram to a given interface or an Ethernet address where the XGMII 280 is associated with multiple address (each address corresponding to one of the GMIIs 278). However, these are merely examples of how an XGMII may route received data frames among multiple GMIIs and embodiments of the present invention are not limited in these respects.

In one embodiment, each of the GMIIs 278 is associated with a unique Ethernet address such that the XGMII receive state machine 210 may route received data frames to a corresponding destination GMII 278 based upon a destination Ethernet address in the data frame. The XGMII receive state machine 210 may maintain a record or table associating each of the GMIIs 278 with its Ethernet address. The XGMII 280 may build this table or record by for each GMII 278, for example, receiving an initial egress data frame from the GMII 278 and associating a source Ethernet address of the initial data frame with the GMII 278. The XGMII receive state machine 210 may then route subsequent ingress data frames to the GMII 278 based upon an association of the destination Ethernet address of the ingress data frames with the Ethernet address associated with the GMII 278.

As discussed above with reference to FIG. 3, a data frame is received at the XGMII 280 as sequentially clocked sixty four bit input words which are stored in a FIFO buffer 224 of a selected destination GMII 278. A multiplexer 204 of the selected GMII 278 may then read out the stored data frame as sequentially clocked eight bit output GMII_RXD[7:0]. An XGMII decode section 208 also receives the input words to detect a start code (e.g., "FB") in a first byte of the received data frame and a terminate code (e.g., "FD") in a last byte of the received data frame. The XGMII decode section 208 may provide start and terminate signals to the XGMII receive state machine 210 in response to detecting the start and termination codes. The start and terminate signals enable the XGMII receive state machine 210 to determine the size (e.g., number of eight bit bytes) of the received data frame by counting the number of eight bit bytes in the received data frame.

Upon determining the size of the received data frame, the XGMII receive state machine 210 may write the size information as the number of received bytes in a buffer 212 of the selected GMII 278 in association with the received data frame. Alternatively, XGMII receive state machine 210 may store the size of the received data frame with the received data bytes in the buffer 224 of the selected destination GMII 278.

A multiplexer 204 of the selected destination GMII 278 outputs byte portions of the data frame stored in the buffer 124 in response to a byte_en[2:0] signal from a GMII receive state machine 202 while the signal GMII_RXDV is asserted. The GMII receive state machine 202 may determine the last byte of the stored data frame to be transmitted based upon the size information stored by the XGMII receive state machine 210. Upon determining the last byte in the data frame, the GMII receive state machine 202 may provide a value for the signal byte_en[2:0] to skip over the terminate code in the stored data frame (e.g., "FD") and de-assert the signal GMII_RXDV following transmission of the last byte prior to the terminate code.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A system comprising:
   a 10 Gigabit media independent interface (XGMII) to transmit and receive data frames;
   a plurality of media access control (MAC) devices, each MAC device being associated with an Ethernet address, each MAC device being coupled to an associated Gigabit media independent interface (GMII) to transmit data frames to and receive data frames from the XGMII; and
   a bus conversion device to select a MAC device to receive a data frame from the XGMII according to an association of a destination Ethernet address in the data frame and the Ethernet address of the selected MAC device.

2. The system of claim 1, wherein the system further comprises a data transceiver to transmit data frames between the XGMII and an optical transmission medium.

3. The system of claim 2, wherein the data transceiver further comprises a physical media attachment (PMA) portion and the system further comprises an optical transceiver coupled to the PMA.

4. The system of claim 1, wherein the bus conversion device further comprises:
   logic to forward a data frame received from a GMII to the XGMII in sequentially clocked multi-byte data words;
   logic to insert one or more trailing bytes in a multi-byte word comprising a tail portion of the received data frame to the XGMII, wherein the trailing bytes comprise a terminate code and the number of trailing bytes is based upon a size of the received data frame.

5. The system of claim 4, wherein each GMII comprises a byte wide input to receive a data frame in sequentially clocked bytes, and wherein the bus conversion device further comprises a buffer to store the data frame upon receipt at the GMII and provide the stored data frame to the XGMII in sequentially clocked words comprising four or more data bytes.

6. The system of claim 4, wherein the bus conversion device further comprises a byte counter to determine the size of the received data frame based upon a count of the number of bytes in the received data frame.

7. The system of claim 1, wherein the bus conversion device further comprises:
   logic to forwarding a data frame received at the XGMII to a GMII as sequentially clocked data bytes, the data frame comprising a terminate code in one or more trailing bytes; and
   logic to inhibit transmission of the terminate code from the GMII based upon a size of the received data frame.

8. The system of claim 7, wherein the XGMII comprises an input to receive the data frame as sequentially clocked words comprising four or more bytes, and wherein the bus conversion device further comprises a buffer to store the data frame upon receipt at the first XGMII.

9. The system of claim 7, wherein the bus conversion device further comprises a byte counter to determine the size of the received data frame in response to a start code and terminate code in the received data frame.

10. A system comprising:
    an Extended Attachment Unit Interface (XAUI) data link to transmit data frames to and receive data frames from a 10 Gigabit media independent interface (XGMII);
    a plurality of Gigabit media independent interfaces (GMIIs) to transmit data frames to and receive data frames from the XGMII, each GMII being associated with an Ethernet address; and
    a bus conversion device to select a GMII to receive a data frame from the XGMII according to an association of a destination Ethernet address in the data frame and the Ethernet address of the selected GMII.

11. The system of claim 10, wherein the XAUI data link further comprises a first extended sublayer circuit (XGXS) coupled to the XGMII and a second XGXS coupled to a backplane interface.

12. The system of claim 10, wherein the system comprises at least one media access control (MAC) device coupled to one of the GMIIs.

13. The system of claim 10, wherein the system further comprises at least one data transceiver coupled to one of the GMIIs, the data transceiver comprising a physical coding sublayer portion and a physical media attachment portion.

14. The system of claim 10, wherein the bus conversion device further comprises:
    logic to forward a data frame received from a GMII to the XGMII in sequentially clocked multi-byte data words;
    logic to insert one or more trailing bytes in a multi-byte word comprising a tail portion of the received data frame to the XGMII, wherein the trailing bytes comprise a terminate code and the number of trailing bytes is based upon a size of the received data frame.

15. The system of claim 14, wherein each GMII comprises a byte wide input to receive a data frame in sequentially clocked bytes, and wherein the bus conversion device further comprises a buffer to store the data frame upon receipt at the GMII and provide the stored data frame to the XGMII in sequentially clocked words comprising four or more data bytes.

16. The system of claim 14, wherein the bus conversion device further comprises a byte counter to determine the size of the received data frame based upon a count of the number of bytes in the received data frame.

17. The system of claim 10, wherein the bus conversion device further comprises:
    logic to forwarding a data frame received at the XGMII to a GMII as sequentially clocked data bytes, the data frame comprising a terminate code in one or more trailing bytes; and
    logic to inhibit transmission of the terminate code from the GMII based upon a size of the received data frame.

18. The system of claim 7, wherein the XGMII comprises an input to receive the data frame as sequentially clocked words comprising four or more bytes, and wherein the bus conversion device further comprises a buffer to store the data frame upon receipt at the XGMII.

19. The system of claim 7, wherein the bus conversion device further comprises a byte counter to determine the size of the received data frame in response to a start code and terminate code in the received data frame.

* * * * *